United States Patent [19]

Compeau et al.

[11] Patent Number: 5,046,283
[45] Date of Patent: Sep. 10, 1991

[54] POWER SLIDING DOOR CLOSER

[75] Inventors: David E. Compeau, Stanford, Calif.; Mark Manuel, Mt. Clemens, Mich.; William L. Priest, Rochester Hills, Mich.; Lloyd W. Rogers, Jr., Utica, Mich.; Mark D. Nicholas, Mt. Clemens, Mich.

[73] Assignee: General Motors Corporation, Detroit, Mich.

[21] Appl. No.: 653,995

[22] Filed: Feb. 12, 1991

Related U.S. Application Data

[63] Continuation of Ser. No. 514,453, Apr. 25, 1990, abandoned.

[51] Int. Cl.⁵ .............................................. E05F 15/00
[52] U.S. Cl. ........................................ 49/138; 49/360
[58] Field of Search .................. 49/138, 280, 360, 214

[56] References Cited

U.S. PATENT DOCUMENTS

| | | | |
|---|---|---|---|
| 2,971,755 | 2/1961 | Green | 268/65 |
| 4,549,369 | 10/1985 | Foley, Jr. | 49/279 |
| 4,612,729 | 9/1986 | Sato | 49/362 |
| 4,617,757 | 10/1986 | Kagiyama et al. | 49/280 |
| 4,640,050 | 2/1987 | Yamagishi et al. | 49/280 |
| 4,813,304 | 3/1989 | Kobayashi | 49/360 X |
| 4,842,313 | 6/1989 | Boyko et al. | 292/341.16 |
| 4,862,640 | 9/1989 | Boyko et al. | 49/280 X |
| 4,887,390 | 12/1989 | Boyko et al. | 49/214 |

Primary Examiner—Philip C. Kannan
Attorney, Agent, or Firm—Charles E. Leahy

[57] ABSTRACT

A sliding door in a van is mounted on tracks for sliding movement between open and closed positions. At the closed position a weather strip is compressed and a door latch is latched. A cable is attached to the door and routed through the vehicle body via pulleys so that pulling the first cable end opens the door and pulling the second cable end closes the door. A motorized drive mechanism includes first and second reels mounted concentrically and having the cable ends wrapped respectively about the reels in opposite directions. A motor drives in one direction rotating the first reel to open the door and is reversible to rotate the second reel to close the door. Each of the reels has a large diameter portion for winding the cable to provide relatively high speed and low force door movement over the greatest portion of travel and a small diameter portion for winding the cable to provide relatively low speed and high force movement of the door during the lesser portion of travel of the door closest to the closed position. The reels have cable seat grooves to receive the cable and a spiral ramp groove to connect the large and small diameter portions. A tension retaining spring acts between the two reels to always maintain the cable under tension.

6 Claims, 3 Drawing Sheets

POWER SLIDING DOOR CLOSER

This is a continuation of application Ser. No. 07/514,453 filed on Apr. 25, 1990, now abandoned.

The invention relates to a motorized mechanism for opening and closing a sliding vehicle closure such as a door or window and more particularly provides improved closing and latching of the closure.

BACKGROUND OF THE INVENTION

It is known in motor vehicles to provide a closure such as a side door slidably mounted on tracks for fore and aft sliding movement between open and closed positions. As the door reaches the closed position a weatherstrip is compressed to provide weather tight sealing, and a door latch is latched to retain the door in the closed position. In order to obtain such latching of the door and compression of the weatherstrip, the vehicle user slides the door rapidly toward the closed position.

It is also known to provide a motorized mechanism for moving such a sliding door. In particular it is known to use motor driven pulleys to wind and unwind cables attached to the door, with one cable for pulling the door forward, and another cable for pulling the door rearward.

It is necessary and desirable that such power door closing systems control the closing speed of the door. The vehicle user wishes the door to move at a rapid speed which expedites vehicle ingress and egress, and yet without slamming the door. It is also necessary to control the closing force of the door so that the door is closed with force sufficient to latch the door latch and compress the weatherstrip.

SUMMARY OF THE INVENTION

A sliding door in a van is conventionally mounted on tracks for sliding movement between open and closed positions. When the door reaches the closed position a weather strip is compressed and a door latch is latched. A cable is attached to the door and routed through the vehicle body via pulleys so that pulling the first end of the cable slides the door toward the open position and pulling the second end of the cable pulls the door towards the closed position. A motorized drive mechanism for pulling the cables includes first and second reels mounted concentrically and having the cable ends wrapped respectively about the reels in opposite directions. The motor drives in one direction rotating the first reel in the cable winding direction to open the door and is reversible to rotate the second reel in the cable winding direction to close the door. Each of the reels has a large diameter portion for winding the cable to provide relatively high speed and low force door movement over the greatest portion of travel and a small diameter portion for winding the cable to provide relatively low speed and high force movement of the door during the lesser portion of travel of the door closest to the closed position. Thus the door closes and opens at high speed over the greatest portion of travel but then travels with high force to effectively compress the weather strip and latch the latch. The large diameter portion and small diameter portion of the reels have cable seat grooves to receive the cable and a spiral ramp groove to connect the large and small diameter portions so that the point of exit of the cable from the reels transit from the one portion to the other during reel rotation. A tension retaining spring acts between the two reels to always maintain the cable under tension.

Accordingly, the object, feature, and advantage of the invention resides in the provision of sliding door closer in which the cable is wound upon a reel having a large diameter portion winding the cable to provide high speed and low force door movement over a greater portion of the door travel and a small diameter portion for winding the cable to provide relatively low speed and high force movement of the door during the portion of travel closest to the closed position to thereby effectively latch and seal the door.

Another object, feature, and advantage of the invention resides in the provision of a door closer having cable ends mounted on cable winding reels with a spring acting between the reels to maintain tension on the cables.

These and other objects, features, and advantages of the invention will become apparent upon consideration of the description of the preferred embodiment and the appended drawings in which:

DESCRIPTION OF THE PREFERRED EMBODIMENT

Figure 1:
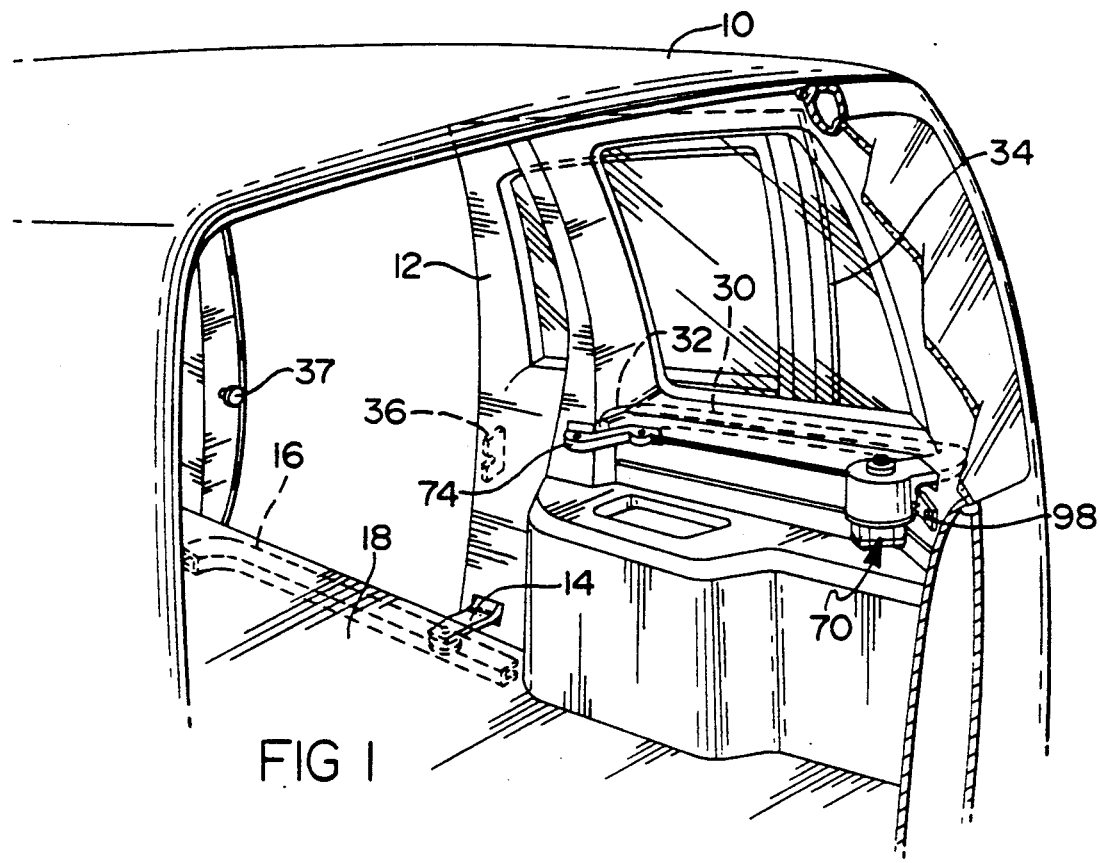
FIG. 1 is a perspective view of a vehicle interior showing the general arrangement of the sliding door and the closing mechanisms.
Figure 2:
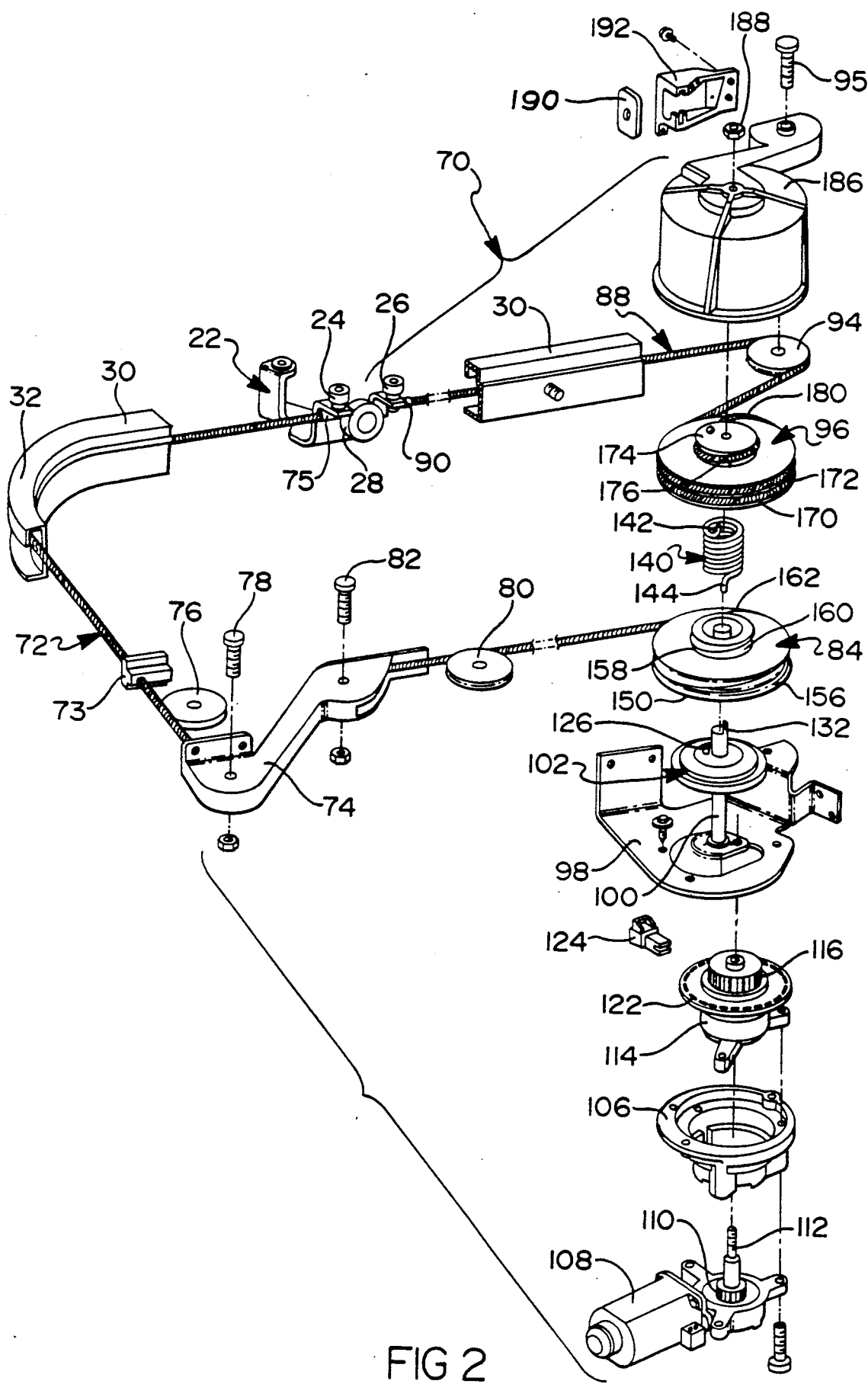
FIG. 2 is a exploded view of the door closing mechanism.

FIG. 1 is a partial perspective view of a van type body 10 in which a door 12 is mounted for fore and aft sliding movement. An arm 14 reaches inboard at the bottom of the door and carries a roller which rides in a lower track 16 concealed beneath the floor 18. As best seen in FIG. 2, an upper arm 22 reaches inboard from the door 12 and carries rollers 24, 26, and 28 which roll in an upper track 30 mounted on the side of the van 10. FIG. 1 shows the door in the open position. Forward sliding movement of the door is enabled by the travel of the door mounted rollers within the lower track 16 and the upper track 30. Each of these tracks is curved inwardly at the forward end thereof, as shown in FIG. 2 at 32 with respect to the upper track 30, so that the door glides inwardly to close the door opening as the door reaches the fully closed position. A weatherstrip 34 is carried on the door and compresses against the body when the door reaches the closed position. A door latch 36 is carried by the door and latches with a striker mounted on the body to latch the door 12 in the closed position. The door latch 36 and striker 37 are shown in FIGS. 4, 5, and 6.

Figure 4:
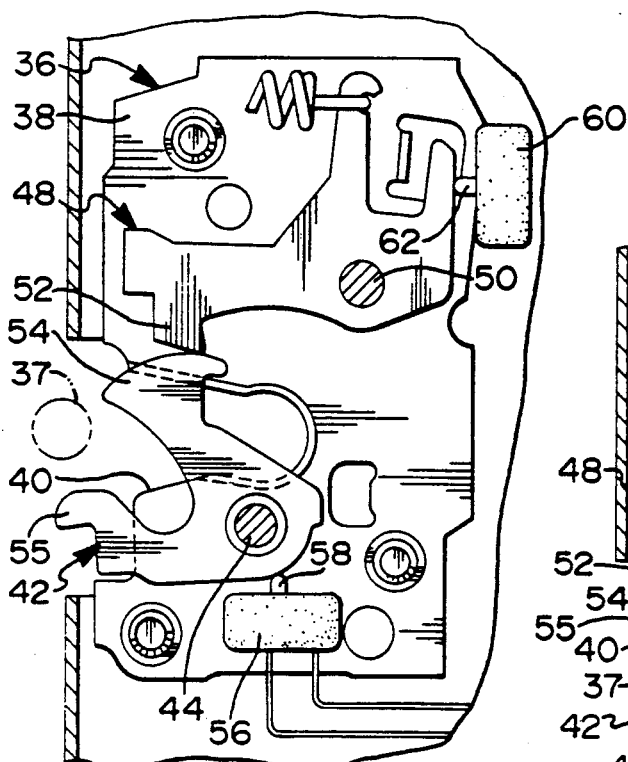
FIG. 4 is a view of the door latch showing the door latch in the unlatched position.

As seen in FIG. 4, the latch 36 includes a housing 38 having a throat 40 which captures the striker 37 as the door approaches its closed position. A fork bolt 42 is mounted on the housing 38 by pivot 44.

Figure 5:
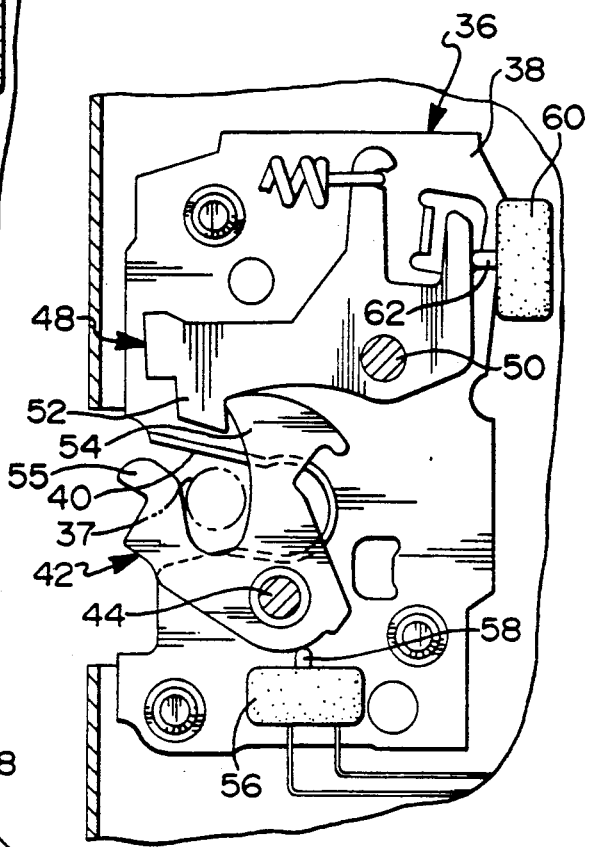
FIG. 5 is a view of the door latch of FIG. 4 as shown in the secondary latched position.

As seen in FIG. 5 the entry of striker 37 into the throat 40 causes fork bolt 42 to rotate clockwise to the secondary latched position of FIG. 5 in which a detent 48 mounted on housing 38 by pivot 50 has a detent tooth 52 which engages a latch hook 54 of the fork bolt 42.

Figure 6:
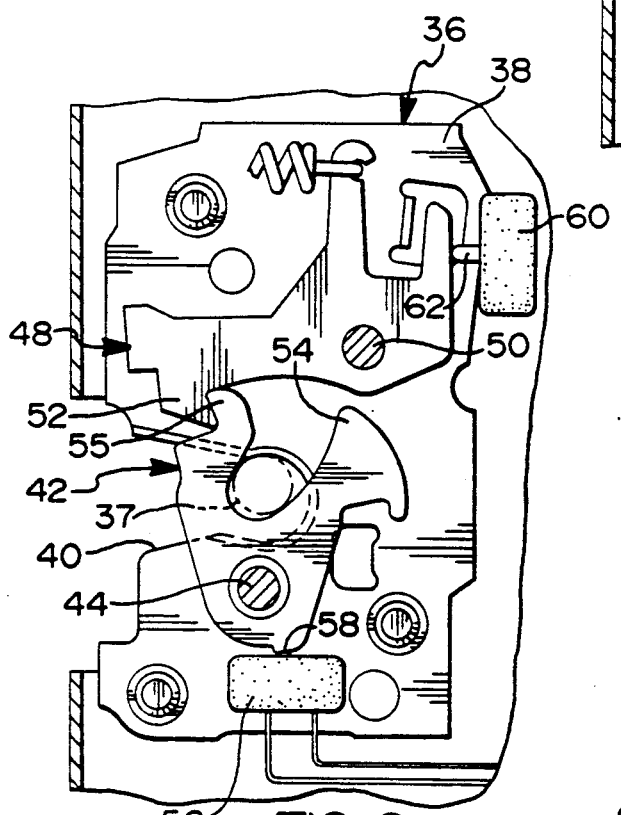
FIG. 6 is a view of the door latch shown in the primary latched condition.

FIG. 6 shows the position of the door latch 36 with the door 12 in the fully closed position in which the striker 37 has rotated the fork bolt 42 further clockwise to the primary latched position in which the detent tooth 52 has become engaged with a primary hook 55 of the fork bolt 52.

The door latch 36 includes an electrical switch 56 which having a follower 58 which senses the position of the fork bolt 42 and an electrical switch 60 having a follower 62 which senses the position of the detent 48.

Figure 3:
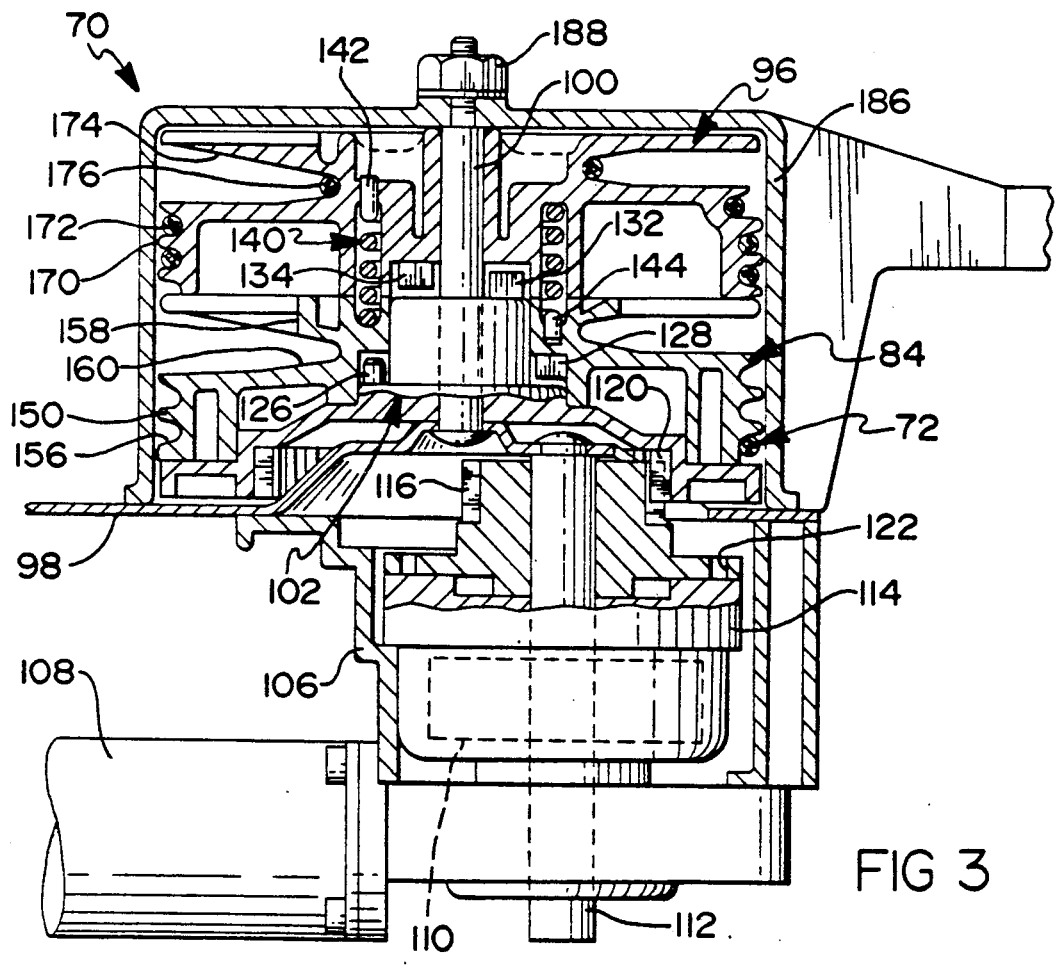
FIG. 3 is a sectional view taken through the motor drive mechanism of the invention having parts broken away and in section.

Referring to FIGS. 2 and 3, the motor drive mechanism generally indicated at 70 is shown. A cable 72 has an end 75 connected to the door arm 22 and extends through the curved forward end 32 of the track 30 and is threaded through grommets 73 and into a guide sleeve 74 mounted on the side wall of the vehicle body as shown in FIG. 1. The guide sleeve carries a pulley 76 mounted on axle 78 and a pulley 80 mounted on axle 82 which route the cable 72 rearwardly to a first reel 84 which may be rotated in the clockwise direction to wind-up cable 72 and thereby pull the door forwardly towards the closed position.

A cable 88 has an end 90 connected to the door arm 22 and extends through the track 30 and around a pulley 94 mounted on axle 95 to route the cable 88 to a second reel 96 which may be rotated counterclockwise to wind the cable 80 and thereby pull the door 12 rearwardly to open the door.

The reels 84 and 96 are mounted on the vehicle via a mounting bracket 98 bolted to the body and having a spindle 100 staked thereto. A drive gear 102 is seated on the spindle. The reel 84 is rotatably supported on the drive gear 102. The reel 96 rests atop the reel 84 and rotatably seats on the spindle 100 and reel 84. A housing 106 is suspended from beneath the bracket 98 and supports an electric motor 108 which drives a pinion gear 110 seated upon a stationary spindle 112 staked to bracket 98. An electromagnetic clutch assembly 114 is seated on the spindle 112 and has an input gear, not shown, which meshes with the pinion gear 110, and an output gear 116 which meshes with internal gear teeth 120 carried on the drive gear 102. The output gear 116 carries a slotted disc 122 which underlies a stationary sensor 124 for connection to an electrical circuit.

A lost motion drive connection is provided between the drive gear 102 and reel 84. The lost motion connection includes a drive lug 126 carried by the drive gear 102, as seen in FIG. 2, and a complementary drive lug 128, which is carried by the reel 84, as seen in FIG. 3. A lost motion connection is also provided between the drive gear 102 and the reel 96. A drive lug 132 is carried on the upper face of the drive gear 102, as seen in FIG. 2, and is engageable with a complementary drive lug 134 carried on the pulley 96 as seen in FIG. 3.

As seen in FIGS. 2 and 3, a tension retaining spring 140 is a coil spring and is seated in an annular opening in the reels 84 and 96. An upper spring end 142 is anchored on the reel 96 and a lower spring end 144 is anchored on the reel 84. The tension retaining spring 140 acts to urge reel 96 in the counterclockwise winding direction and urge reel 84 in the opposite clockwise cable winding direction so that the cables 72 and 88 are maintained in tension at all times.

As best seen in FIGS. 2 and 3, the reel 84 has a large diameter portion 150 which has a spiral cable groove 156 and a small diameter portion 158 which has a spiral cable groove 160. A ramp groove 162 connects the large diameter cable groove 156 with the small diameter cable groove 160. The end of cable 72 is anchored on the outer diameter portion of the reel 84.

Furthermore, as seen in FIGS. 2 and 3, the reel 96 is constructed similar to the reel 84 and has a large diameter portion 170 with spiral cable groove 172 and a small diameter portion 174 with a spiral cable groove 176. A ramp groove 180 connects the large diameter cable groove 172 and the small diameter cable groove 176. As shown in FIG. 2, the end of the cable 88 is attached to the reel 96 on the small diameter portion 174.

As best seen in FIG. 2 a cover 186 is installed over the reels 84 and 96 and is retained by a nut 188. The cable 88 exits housing 86 through a grommet 190 supported by outlet 192.

OPERATION

In the drawings, the door 12 is shown in the open position. Cable 88 is fully wound up on the reel 96. The cable 72 is fully unwound from the reel 84. The tension retaining spring 140 acts between the reels 84 and 96 urging reel 96 counterclockwise and urging reel 84 clockwise so that the cables 72 and 88 are both retained in tension.

When the vehicle user wishes to close the door, an electrical circuit described in copending application G-3243 is actuated to energized the drive gear 126 via pinion gear 110, electromagnetic clutch 114, and output gear 116. Clockwise rotation of the drive gear 102 will cause its drive lug 126 to engaged the complementary drive lug 128 of reel 84 and rotate reel 84 in the clockwise direction to wind up cable 72, which in turn pulls the door 12 forward toward to the closed position. The cable is progressively wound upon the spiral groove 156 of the large diameter portion 170 of the reel 84. As the door nears the closed position, the cable 72 traverses the ramp groove 162 and further rotation of the reel 84 causes the cable to be wound in the cable groove 160 of the small diameter portion 158 of the reel 84.

Accordingly, assuming that the motor turns at a constant speed, the winding of the cable 72 on the large diameter portion 150 of the reel 84 causes the door 12 to travel at a relatively high speed over a large distance, and then as the door approaches the closed position, the winding of the cable 72 on the small diameter portion 158 causes the door 12 to move at a slow speed but with a greater force being applied to the cable 72. This relatively greater force effectively compresses the weatherstrip 34 carried by the door 12 and to engage the door latch 36 with the striker 37 as shown in FIGS. 4, 5 and 6.

It will be understood that the forward movement of the door extracts the cable 86 from the reel 96 against the bias of the tension retaining spring 140. The tension retaining spring 140 acts between the two reels so that the spring works to constantly maintain a predetermined level of tension in the cable 88 as it is unwound from the reel 96.

Figure 7:
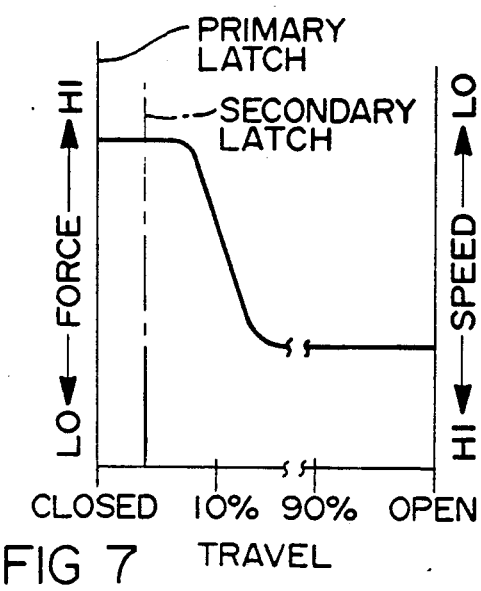
FIG. 7 is a plot of door travel versus force.

FIG. 7 is a plot showing the travel of the door versus the force imposed on the door 12 by the drive mechanism. Accordingly, it is seen that the travel of the door 12 from the open position toward the closed position occurs at relatively low force but high speed until the door traveled 90% of the distance toward the closed position. Then the cable begins to wind on the small diameter portion so that final travel occurs in conditions of high force and low speed as the secondary latching function and the primary latching functions of the latch 36 are performed.

When it is decided to open the door, the door latch 36 is unlatched and motor 108 energized so that drive gear 102 rotates in the counterclockwise direction and drive lug 132 engages the complementary drive lug 134 of reel 96 to rotate the reel 96 in counterclockwise direction and wind cable 88. The end of cable 88 is attached to the small diameter portion of the reel 96 so that the initial movement of the door occurs with high force at low speed. As winding continues the cable 88 traverses the ramp groove 180 and then continues to wind on the large diameter portion 170 of the reel 96 so that the door movement progresses at high speed and relatively low force.

Thus it is seen that the invention provides a new and improved closure for a sliding door in a van type vehicle in which a cable is wound on a reel having a large diameter portion winding the cable to provide high speed and low force door movement over a greater portion of the door travel and a small diameter portion for winding the cable to provide relatively low speed and high force movement of the door during the portion of the travel closest to the closed position to thereby latch and seal the door.

Although the Description of the Preferred Embodiment relates to the closure being a door which slides fore and aft, the invention is also applicable to a closure which is a window panel which slides either fore and aft or up and down.

The embodiments of the invention in which an exclusive property or privilege is claimed are defined as follows:

1. Apparatus for opening and closing a closure slidably mounted on a vehicle body comprising:
   cable means attached to the closure and having first and second ends;
   a first reel having the first end of the cable means connected thereto so that rotation of the first reel to wind the cable means thereon slides the closure toward the closed position;
   a second reel having the second end of the cable means connected thereto so that rotation of the second reel to wind the cable means thereon slides the closure toward the open position;
   rotary drive means adapted to drivingly engage and rotate the first reel to wind the cable means thereon when the rotary drive means is energized in one direction and adapted to drivingly engage and rotate the second reel to wind the cable means thereon when the motor drive means is energized in the other direction;
   and spring means acting to urge rotation of the first and second reels in their respective direction of rotation to wind the cable ends thereon so that the cable means remains in tension during the unwinding thereof from the reels.

2. The combination of claim 1 in which the rotary drive means is a single reversible motor and is connected to both the first and second reels by lost motion driving connections so that the energization of the motor in either direction causes the motor to be drivingly engaged with one of the reels and simultaneously drivingly disengaged from the other reel.

3. The combination of claim 2 in which the first and second reels are coaxially mounted on a spindle and the spring means acts between the reels to urge the reels to rotate in opposite directions about the spindle.

4. Apparatus for opening and closing a closure slidably mounted on a vehicle body and having a latch and weatherstrip for latching and sealing the closure in the closed position comprising:
   cable means attached to the closure and having first and second ends;
   a first reel having the first end of the cable means connected thereto so that rotation of the first reel to wind the cable means thereon slides the closure toward the closed position;
   a second reel having the second end of the cable means connected thereto so that rotation of the second reel to wind the cable means thereon slides the door toward the open position;
   rotary drive means adapted to rotate the first reel to wind the cable means thereon to close the closure, and rotate the second reel to wind the cable means thereon to open the closure;
   each of said reels having a large diameter portion for winding the cable means to provide relatively high speed and low force movement of the closure over a greater portion of the travel between open and closed position and a small diameter portion for winding the cable to provide relatively low speed and high force movement of the closure during the lesser portion of travel of the closure closest to the closed position whereby the closure closes at a high speed and then closes at high force to effectively latch and seal the closure.

5. The apparatus of claim 4 in which the large diameter portion and the small diameter portion of the reels have cable seat grooves to receive the cable and have a spiral ramp groove to connect the large and small diameter portions so that the point of exit of the cable from the reels transits from one portion to the other during rotation of the reels.

6. The combination of claim 5 in which the first and second reels are coaxially mounted on a spindle and spring means acts between the reels to urge the reels to urge rotation of the first and second reels in their respective directions of rotation to wind the cable ends thereon so that the cable means remains in tension during the unwinding thereof from the reels.

* * * * *